United States Patent Office 3,086,154
Patented Apr. 16, 1963

3,086,154
AUTOMATIC CONTROL OF MACHINE TOOLS
Robert Ramsey Lowther, Hayes, and Peter Laurence Sell, West Drayton, England, assignors to Electric & Musical Industries Limited, Hayes, England, a company of Great Britain
Filed Feb. 27, 1958, Ser. No. 717,938
Claims priority, application Great Britain Feb. 27, 1957
5 Claims. (Cl. 318—162)

This invention relates to the automatic control of machine tools.

Various proposals have been made heretofore for the construction of apparatus for producing automatic control of machine tools. In many cases control signals are produced which are capable of giving continuous control of the motion of the tool relative to a workpiece in two co-ordinate directions, whereby a continuous profile can be cut. However, it has also been proposed to provide continuous three dimensional control but this leads to considerable complexity, especially when account has to be taken of the dimension of the cutter, if the latter is other than ball ended. Moreover, it is generally difficult to prepare an instruction programme for the control mechanism which gives continuous three dimensional control. On the other hand unless three dimensional automatic control is possible, the range of applications of the control mechanism is limited.

The object of the present invention is to reduce the problem indicated in the preceding paragraph.

According to the present invention there is provided automatic control mechanism for a machine tool wherein means are provided for setting up two control signals representing contoured dimensions, and a third control signal representing a stepped dimension.

A control signal representing a contoured dimension means a signal which varies in a continuous or virtually continuous fashion so that the two control signals representing contoured dimensions can cause the machine tool to describe a smooth contour in a given plane. A control signal representing a stepped dimension means a control signal which varies in discrete steps, whereby the machine tool can be caused to describe successive contours at different levels of a third dimension. As a result of the invention the advantages of continuous three dimensional control are largely obtained because in most contour-machining only two machine-motions are required to be controlled at any one time and the third feed generally remains fixed at some specified station throughout this process.

According to a preferred feature of the invention, switch means are provided whereby the three control signals set up by the control mechanism are applied selectively to control the relative motion of the machine tool in three co-ordinate directions, so that the control signals representing the stepped dimension can be employed to control the motion in any one of three co-ordinate directions.

Other features of the present invention comprise means for adding a datum shift signal to each control signal, and means for restoring the tool to a safe position if the error signal in any servo-amplifier exceeds a predetermined limit.

In order that the invention may be clearly understood and readily carried into effect, the invention will be described with reference to the accompanying drawings, in which.

Figure 1:
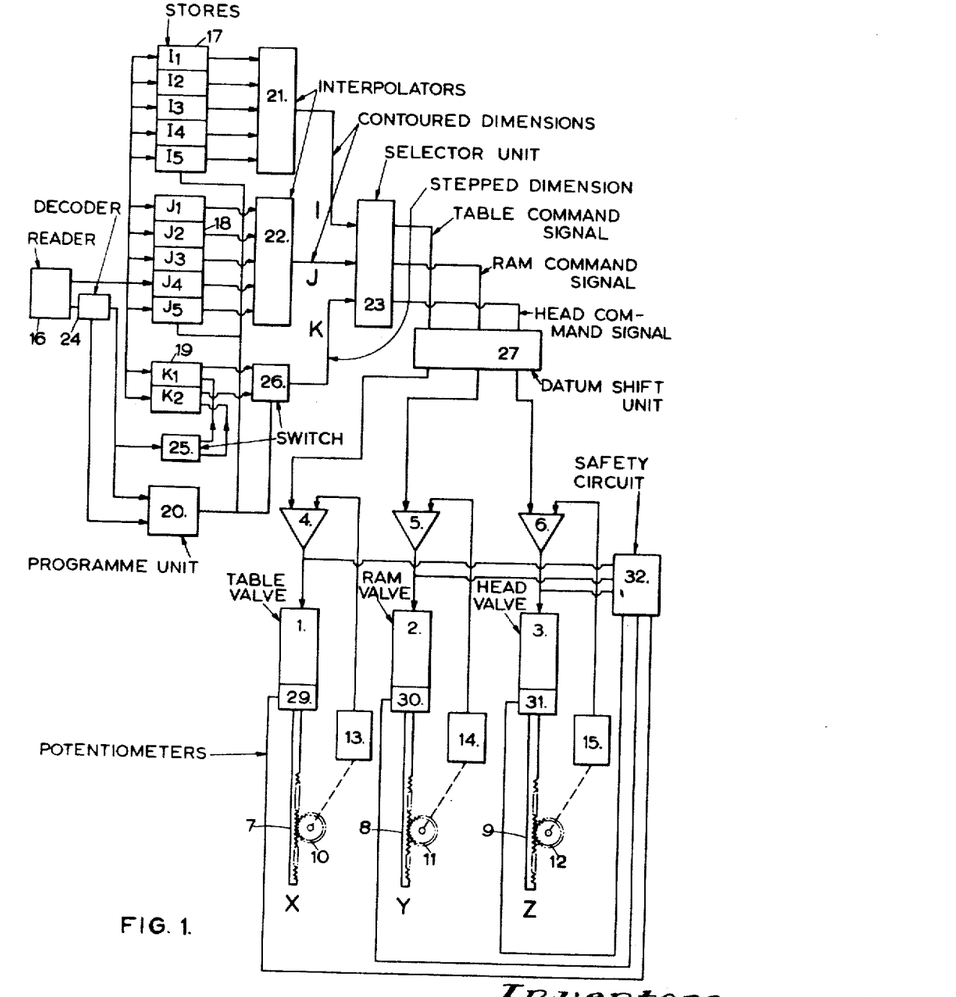
FIGURE 1 illustrates in block form one example of an automatic control mechanism for a machine tool, according to the present invention.

In the drawing, the machine tool itself is not illustrated but it is to be understood that it is a hydraulically controlled machine in which the displacement of the work-table in two mutually perpendicular directions can be controlled independently by hydraulic valves 1 and 2. One of these directions is taken as defining the X co-ordinate direction and the valve 1 for controlling displacement in this direction is called the table valve. The other direction is taken as defining the Y co-ordinate direction and this control is effected by the valve 2 which controls a ram for displacing the slide on which the table is mounted. The head for carrying the tool is capable of independent control in a third co-ordinate direction perpendicular to the X and Y directions. This direction is termed the Z co-ordinate direction and a valve 3 for controlling displacement in this direction is termed the head valve. The valves are electro-hydraulic valves which produce displacement in response to electrical error signals derived from respective servo amplifiers, 4, 5 and 6. Racks 7, 8 and 9 are mounted respectively on the work-table, the machine slide and the head are employed to drive potentiometer devices 13, 14 and 15 through the intermediary of pinions 10, 11 and 12 which engage the racks. The devices 13, 14 and 15 set up analogue signals representing the displacement of the respective components of the machine. These analogue signals are applied as feedback signals to the aforesaid servo amplifiers. The input signals of the servo amplifiers are command signals derived from automatic control mechanism and the difference between the command and feedback signals constitute the error signals which control the hydraulic valves.

The control mechanism for deriving the command signals receives initial information from a reader 16 adapted to read punched paper tape. The reader may for example be similar to a tele-printer tape reader. The signals punched on the tape are in the form of the dimensions of the co-ordinate of a series of reference points on the contour to be cut, or on the locus to be traced by the centre of the cutter in order to produce a desired contour. It will be assumed in the present instance that the signals represent the dimensions of co-ordinates on the locus of the cutter centre. To define a point on a three dimensional locus, three co-ordinate dimensions are generally required but in employing the present invention only two co-ordinate dimensions of successive reference points are coded on the tape and the third dimension is encoded after a predetermined recognised signal only when the third dimension changes. A cartesian system of co-ordinates is employed corresponding to the displacements available in the machine, but the co-ordinate directions used in coding the instructions will be referred to as the I, J, K directions since, as will appear, they may be chosen to represent different permutations of the X, Y, Z displacements available in the machine. A store array 17 comprising five individual stores $I_1$ to $I_5$ is provided for I dimension signals and a similar store array 18 comprising five individual stores $J_1$ to $J_5$ is provided for J dimension signals. On the other hand a store array 19 comprising only the individual stores $K_1$ and $K_2$ is provided for K dimension signals. It will be assumed initially that a K dimension signal has been established and that a sequence of I and J dimensions is being read from the tape. The dimension signals as they are read are applied alternately to the store arrays 17 and 18 under control of a programme unit 20, the programme unit being advanced step-by-step in order to exercise this control by advance signals from the reader. Each of the stores in the store arrays 17 and 18 may be as described in the specification of co-pending United States application Serial Number 620,145 whilst the interpolators 21 and 22 may each be of the construction described in United States Patent Number 2,929,555. In that event, signals applied to stores in the arrays 17 and 18 are converted into alternating voltages whose amplitudes are analogous to the code signals read by the reader 16. The analogue signals stored in the arrays 17 and 18 are then applied in groups of three at a time to two interpolators 21 and 22 which derive from these signals continuous or virtually continuous command signals representing the I, and J dimension of the continuous locus to be traced by the axis of the cutter. The continuous command signals are applied to a selector unit 23 and these two signals may be referred to as signals representing contoured dimensions.

A decoder 24 is provided in the path from the reader 16 to the programme unit 20 and this decoder is arranged to be sensitive to the recognition signal which precedes a K dimension signal. If this recognised signal is identified, a signal is applied to a switch 25 which conditions one or the other of the two stores in the store array 19 to receive the next dimension signal read from the tape, such signal being representative of a K dimension. After this K dimension signal has been stored, the programme unit 20 is arranged to operate a switch 26 and feed the new K dimension signal to the selector 23. The control is such that this does not occur until the complete contour has been traced in response to I and J dimension signals for the preceding K station. While such a contour is being traced, the signal in the other K dimension store is applied to the selector 23 by the switch 26, operation of the machine being therefore controlled in such a way that a contour cannot be traced until the K station has been established by reading an appropriate signal by the reader 16.

The selector 23 is arranged to apply the I, J and K dimension signals as required to produce control in the X, Y and Z directions selectively, so that the signal representing the stepped dimension can be used to control displacement in either the X or Y or Z direction as required to suit the machine cycle. The selector 23 may comprise a uniselector or so called stepping switch.

A datum shift unit 27 is interposed, as shown, between the selector 23 and the servo amplifiers 4, 5 and 6. This allows the workpiece to be located on the table in the most suitable position regardless of the point on the table taken as the origin of the machine co-ordinate system with respect to which the motions are evaluated. The machine origin may for example be located at the forward, left-hand corner of the machine table and the shift unit 27 allows the command dimensions to be evaluated with reference to an origin located on the workpiece itself. When the workpiece is positioned on the machine table, the shift unit 27 is employed to correct for the separation of the two co-ordinate centres. The shift unit has four decade switches, that is ten position rotary switches, connected in cascade for each co-ordinate direction. The studs of each decade switch have applied to them alternating voltages of appropriate amplitude and phase derived from taps on auto-transformers which are energised from a source of reference voltage, and the voltages selected by the respective switches associated with one co-ordinate direction are additively combined by transformers whereby there can be obtained and added to each command signal a shift signal correct to one part in ten thousand. The decade switches may for example be constructed in a manner similar to that illustrated in British patent specification No. 803,472, the individual switches being provided with dials for manual adjustment and for giving an indication of the setting. The mode of assessing the correction required is to position the workblank on the machine table so that the co-ordinate axes on the blank are parallel to the machine tool axes. The control tape is run through the reader 16 until the initial alignment position is read and the cutter has moved to the corresponding position. If the cutter is not then directly over the appropriate position on the workblank, it is moved to the required position by manually operating the decade switch as in the shift unit 27. As the dials are rotated, the command signals are altered and the cutter is moved in the corresponding direction. The direction of the datum shift along each axis is indicated, to avoid ambiguities, by "left" or "right" for the X axes, "in" or "out" for the Y axes and "up" or "down" for the Z axes. The addition of the datum shift signals to the command signals is achieved by means of transformers which have primary windings fed by the shift voltages and secondary windings in the conductors carrying the command signals.

The apparatus shown in the drawing also incorporates valves 29, 30 and 31 for releasing the machine control valves 1, 2 and 3. The valves 29, 30 and 31 are electrically operated by signals form a safety circuit 32 which observes the error signals in the servo amplifiers 4, 5 and 6. The safety circuit is such that no signal is applied to the valves 29, 30 and 31 if the error signals are within a permissible limit. However, if an error signal exceeds a safe limit, a signal is applied to the corresponding one of the valves 29, 30 and 31 whereby the machine control valves 1, 2 and 3 are released to return the cutter to a datum position, for safety.

Figure 2A:
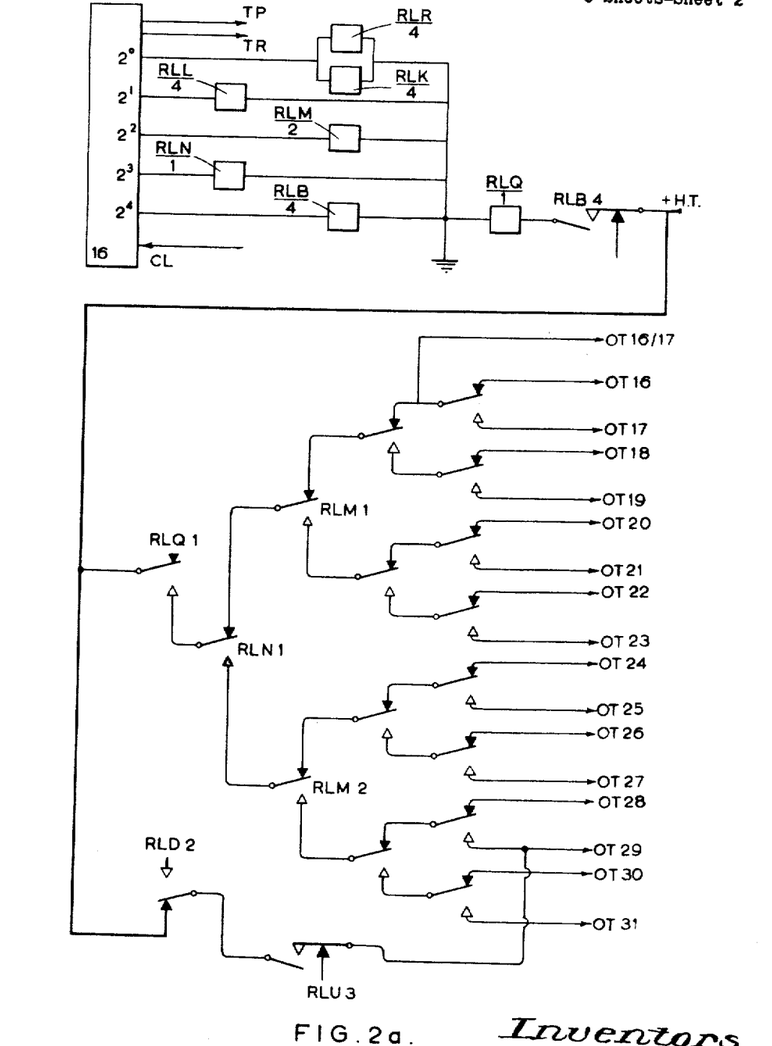
FIGURES 2a, 2b, and 2c illustrate in detail the construction of the programme unit, and some associated parts, used in the mechanism illustrated in FIGURE 1.
Figure 2B:
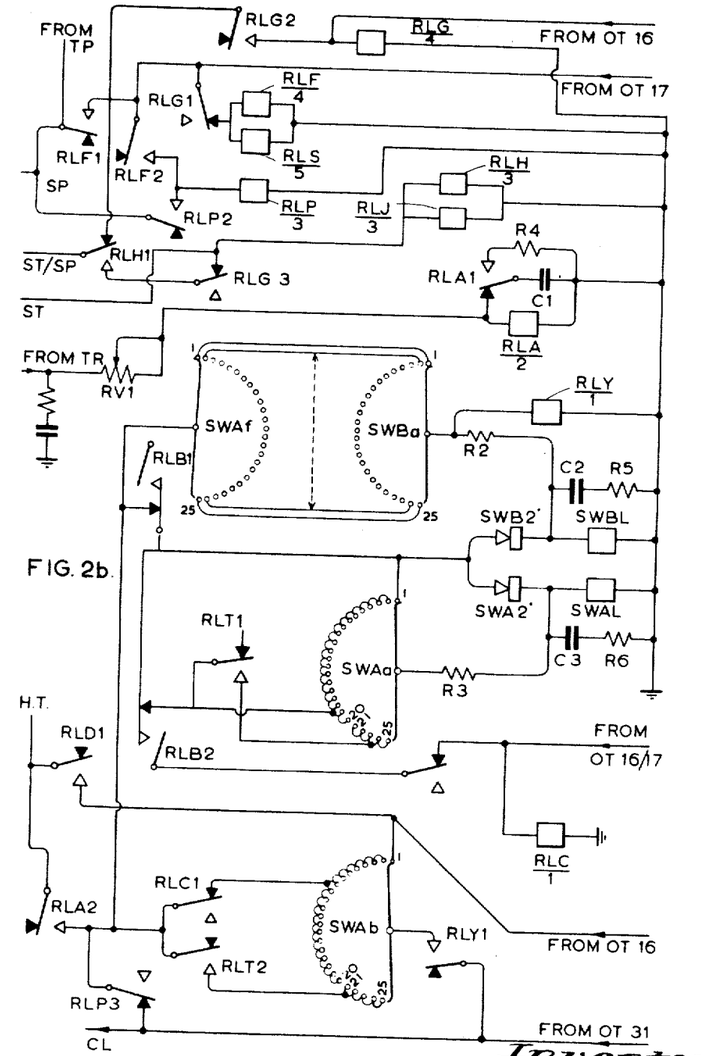
Figure 2C:
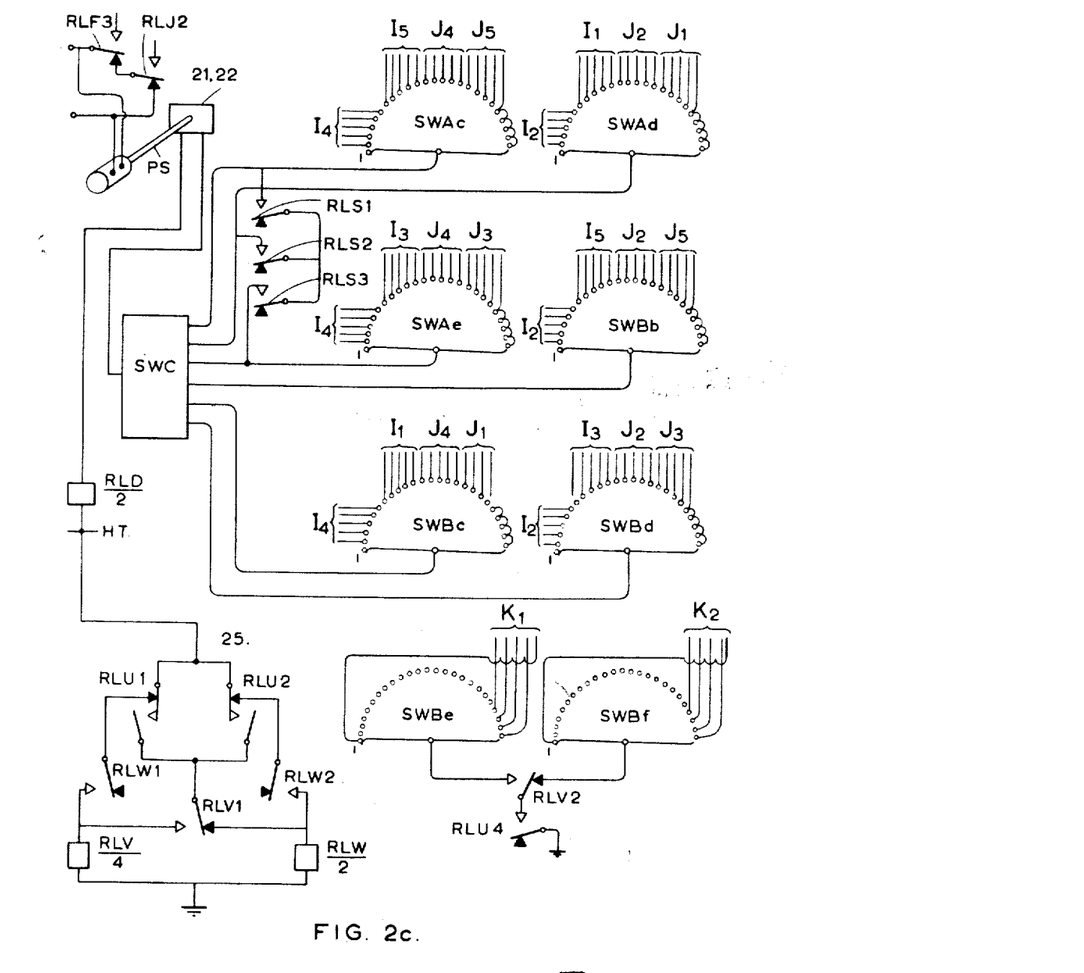

FIGURE 2 illustrates one suitable construction for the programme unit 20 and the decoder 24, assuming that the tape reader 16 is similar to a standard teleprinter tape reader, that the stores are of the construction described in the specification of co-pending United States application Serial No. 620,145 and that the interpolators are of the construction described in United States Patent Number 2,929,555. On this assumption the tape reader 16 is of a commercially available form and for this reason its internal construction will not be described and only its connections with the decoder will be referred to. These connections are provided by relay coils $$\frac{RLB}{4}, \frac{RLK}{4}, \frac{RLL}{4}, \frac{RLM}{2}, \frac{RLN}{1}, \text{ and } \frac{RLR}{4}$$

connected as indicated in output leads which are selectively energised if the tape reader senses, in the tape being read, holes punched in positions which represent $2^0$, $2^1$, $2^2$, $2^3$ and $2^4$ respectively as indicated in the drawing. The switch RLB4 of relay $$\frac{RLB}{4}$$

controls the energising circuit for a relay coil $$\frac{RLQ}{1}$$

The tape reader has a further output terminal TP which is energised with H.T. voltage when a tape is correctly positioned in the reader. A voltage is also maintained on a trip terminal TR except when the clutch of the reader is energised, as it is when a reading step is effected. Energising signals for the clutch are applied to the input lead CL. Further the interpolators 21 and 22 employ parabolic interpolation and the input signals representing values of I and J are interpolated as functions of a common non-geometric parameter. The parameter is represented by a shaft PS which is rotated at a constant rate by the motor M when the latter is energised and which drives two selectors one for each of the interpolators 21 and 22. Corresponding to the respective selector, each interpolator has a group of output studs (not shown), arranged to form a stud circle and the interpolated signals generated by the interpolator from the group of signals applied from the stores at any one time, are fed respectively to the studs. As the aforesaid shaft PS rotates, the selectors move from one stud to the next and so derive the interpolated signals in succession for application to the selector unit 23. The "parameter" shaft PS constitutes the reference timing element of the control mechanism and it is arranged by operating suitable switches to produce signals at predetermined times during each revolution. These considerations are described in United States Patent No. 2,929,555 and are repeated only to facilitate understanding of the operation of the programme unit.

Figure 4:
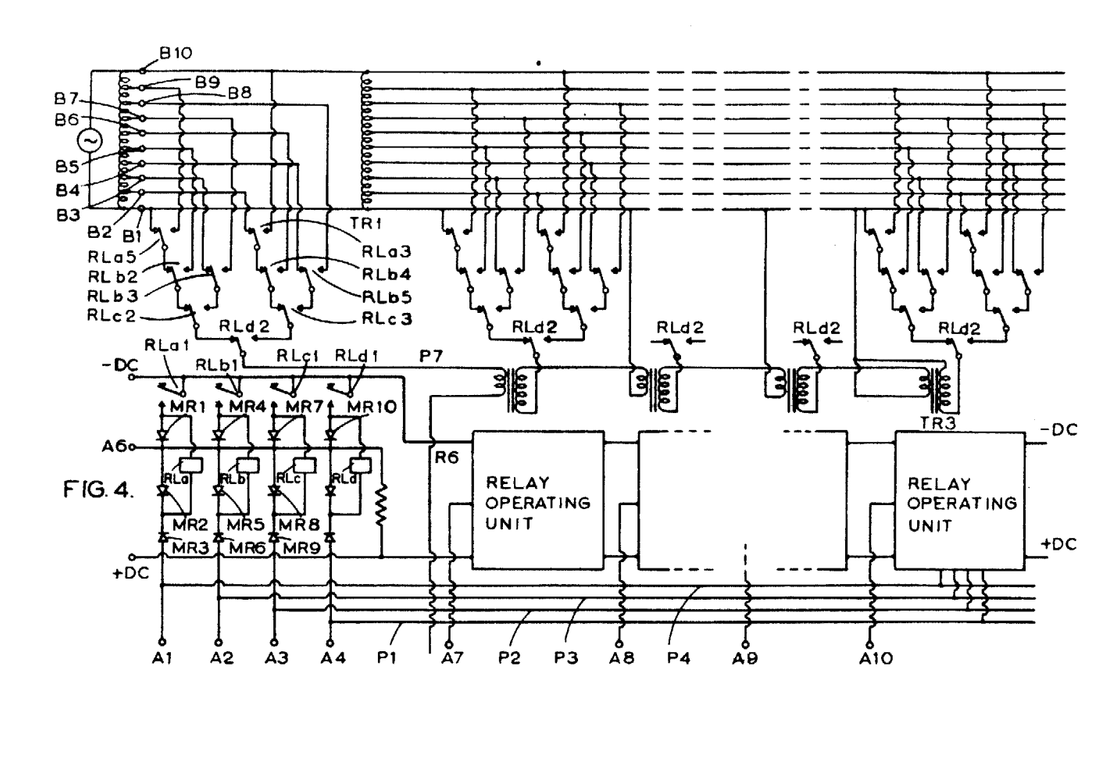
FIGURE 4 illustrates in detail the construction of one of the stores used in the mechanism illustrated in FIGURE 1, the construction being in accordance with the specification of co-pending United States application Serial Number 620,145.

As shown in FIGURE 4, the stores described the specification of co-pending United States application Serial Number 620,145 are arranged to receive signals in a binary decimal code, each store having five decimal units giving capacity for five decimal digits, so that values can be expressed with an accuracy of 1 part in 100,000. The reader 16 is adapted to read tape in which there are successive stations or rows in which intelligence may be coded by five binary code elements, each binary element of value one being represented by a hole and each binary element of value zero being represented by the absence of a hole. Five rows of the tape are used to encode each value of I. J or K, and as only four binary elements are required to encode a decimal digit, the decoder 24 is arranged to respond to any row of the tape in which the fifth binary element (representing $2^4=16$) has value one, the assumption being that any row in which this occurs is not a decimal digit but a special recognition signal. If however a decimal digit is sensed by the reader 16, voltage pulses corresponding to the respective binary code elements are applied in parallel to all the decimal units in all the stores. FIGURE 4 shows the construction of one store, say the store I₁ and when a decimal digit is sensed by the reader 16, the respective voltage pulses are applied via input terminals A1, A2, A3 and A4 and lines P1, P2, P3 and P4 to relay operating units in each of the five decimal units of the store. The relay operating units are of similar construction and operation so that only the left hand one, as seen in FIGURE 4 is shown in detail. The remaining four relay operating units are shown in block form. The relay operating unit 6 shown comprises relays RL*a*, RL*b*, RL*c* and RL*d*, the switches of these relays being differentiated, for example as RL*a*1, RL*a*2 and so on the references MR1, MR2 ... MR12 denote metal rectifiers. Assume that the tape reader 4 senses a hole representing a "1" and transmits a pulse to the terminal A4. No response is produced unless a sensitising signal of negative polarity is applied to terminal A6 so that a current flows via metal rectifiers MR12 and MR10, thereby energising relay MR*d*. A sensitising signal applied to A6 conditions all the relays in the relay operating unit under consideration to respond to pulses corresponding to the respective binary code elements and as will appear sensitising signals are applied in cyclic order to the relay operating units in the difference stores selectively by means of a stepping switch represented in FIGURE 2 by the block SWC. Returning to consideration of the relay operating unit shown in FIGURE 4, energisation of the relay RL*d* causes the switch RL*d*1 to change position so that when the sensing operation of the tape reader 4 is completed, and the voltage pulse disappears from the terminal A6, the energisation of the relay RL*d* continues by conduction from A6 via metal rectifier MR11 and switch RL*d*1 to the negative D.C. supply. The metal rectifiers MR12 and MR10 cease conducting when the sensing operation is completed.

If during the following sensing operation of this relay unit an "0" is sensed by the tape reader contacts 4 then no positive digital pulse is applied to the terminal A4. However, a negative conditioning pulse is applied to the terminal A6 which is effective in de-energising the relay RLD by stopping the conduction of metal rectifier MR11.

Thus any binary number presented to the contacts A1 to A4 simultaneous with a sensitising pulse at A6 will cause a corresponding representative state of the relays RL*a*, RL*b*, RL*c* and RL*d* and a resultant state of the dependent relay switches which is unique for each binary coded decimal digit. The contacts of the relay switches are connected as shown to ten bus-bars B1 to B10, which are connected to tapping points of an auto-transformer TR4 so as to be maintained at alternating potentials of like phase. This auto-transformer TR4 is energised by a reference source of alternating potential S and the tapping points of the auto-transformer are such that there are equal potential differences between succeeding bus-bars B1 to B10, in that order. The connections of the relay switch contacts to the bus-bars are such that the sensing of a binary representation of a decimal digit on a tape causes energisation of the relays to connect the movable contact of the switch RL*d*2 to an alternating potential analogous to the decimal digit via other movable contacts and appropriate bus-bar.

A further auto-transformer TR1 is connected at either end to the source S and has eight intermediate tapping points so that ten bus-bars P8 to P17 may be connected to the auto-transformer TR1 in the same way as B1 to B10 are connected to TR4. The transformer TR1 is provided to prevent excessive loading of the main transformer TR4. The remaining four relay operating units receive sensitising pulses sequentially at terminals A7, A8, A9 and A10 after a sensing operation in the latter relay unit. The five relay units have common positive and negative D.C. supplies, as shown, along lines P5 and P6 respectively. The operation of the remaining four relay units is the same as that described above in so far as each of those four units causes the selection of a potential from the bars P8 to P17 analogous to the binary coded decimal digit sensed by that unit. However, the output of the right hand unit is fed from its contact RL*d*2 to the primary winding of a transformer TR3, the secondary winding of which is in series with the primary winding of a similar transformer TR3 associated with adjacent relay unit. The secondary winding of the further transformer TR3 is connected in series with the primary winding of a third transformer TR3 associated with the centre relay unit, the secondary winding of which third transformer TR3 is connected in series with the primary winding of a similar transformer TR2 associated with the last of the remaining four relay units and mentioned above. Each of the three transformers TR3 and the transformer TR2 has an amplitude reduction ratio of 10 to 1 and are all alike except that one end of the secondary winding of TR2 is connected to the output terminal A5. Thus if five decimal digits in binary code form are sensed sequentially by the tape readers 1 to 4 to represent successive digits on a decimal scale whilst the corresponding conditioning pulses are applied sequentially to the terminals A6 to A10 then the five relay units cause a sequential selection of five potentials analogous to the five binary coded decimal digits. These alternating potentials are maintained until "cleared" by a sequence of five further sensing operations so that, from right to left, the fifth digit analogue potential is reduced in amplitude by a factor of ten and is added to the fourth digit analogue potential which potential sum is reduced in amplitude by a factor ten. This process is repeated again in the third transformer TR3 and again in the transformer TR2 where the second to fifth digit potential analogues, having been scaled down to a level appropriate to their respective decimal digital places and added together, are added finally to the potential analogue of the first digit in the secondary winding of the transformer TR2 which final sum is fed to the output terminal A5. No response is produced however unless a sensitising signal is applied simultaneously. The particular stores to receive the sensitising signals are selected by a stepping switch represented in FIGURE 2 by the block SWC, which is advanced step by step at appropriate times by signals generated by the parameter shaft PS and the decimal units of the selected stores are in turn selected by stepping switches SWA and SWB forming part of the programme unit shown in FIGURE 2. The mode of operation of the stores in response to simultaneous binary code pulses and sensitising signals is explained in the specification of co-pending United States application Serial No. 620,145. The sensitising signal is such that the lead to which it is applied is switched to earth from a bias level at which it is normally maintained.

The stepping switches SWA and SWB each have six banks of contacts denoted by references SWA*a* to SWA*f* and SWB*a* to SWB*f*. There are twenty five contacts, arranged in a semi-circle, in each bank, and each bank has its own rotatable selector. The stepping coils for the selectors are indicated by the references SWAL and SWBL and these are conected in series with interrupter contacts SWA*i* and SWB*i* respectively. As however the construction of multi-bank stepping switches is well known, the construction of the switches SWA and SWB will not be further described. The two switches operate precisely in step, registration being assured by connecting each stud of bank SWA*f* to the corresponding stud of bank SWB*a*. If the two switches are not in step, the relay coil RLY is de-energised, and switch RLY1 is opened to stop operation of the mechanism as will appear. A ten bank stepping switch may if desired be used instead of the two six bank switches SWA and SWB. Conventional symbols and notation are used to denote all relay coils and switches in the drawing. Thus $$\frac{RLA}{2}$$

denotes relay coil A and the numeral 2 under the reference indicates that this coil operates two switches A1 and A2, which are denoted in the drawing by references RLA1 and RLA2. The symbol for $$\frac{RLB}{4}$$

denotes a rapidly acting relay coil. The blade of each relay switch is movable between two contacts, and the contact which the blade engages when the respective coil is de-energised is shown blackened, whilst the contact engaged by the blade when the relay is energised is shown un-blackened. Resistors and capacitors are denoted by self explanatory references and are used mainly to damp switching transients. The relays B, K, L, M, N, Q and R, including their respective switches constitute the decoder 24 of FIGURE 1, no output being produced unless relay coil B is energised, which occurs only if sixteen or higher is sensed by the reader 16. The switch RLB4 in turn energises relay coil Q. The switches of the relays K, L, M, N, Q and R form a decoding tree of known form and connect the lead H.T., on which a potential of 50 volts is maintained, selectively to output leads OT16 to OT31 corresponding to the significance of the recognition code. There is also an output lead OT16/17 from the decoding tree, which is connected to H.T. when either 16 or 17 is sensed. It will be understood that similar decoding trees are included in the stores $I_1$ to $I_5$, $J_1$ to $J_5$, and $K_1$ and $K_2$ which respond selectively to the binary code elements derived from the reader 16 when any row of such element represents a decimal digit 0 to 9.

The relays U, V and W form a two state device which corresponds to the switch 25 in FIGURE 1.

In describing the operation of the programme unit, it will be assumed that initially the code for seventeen, namely 16+1, is sensed by the reader. This code is termed the alignment code. By reason of the energisation of the relays Q and K, the conductors OT17, OT16/17 is connected to the H.T. line and the relay coils C, F and S are energised, and by the action of switch F2 the relay P is energised. The switch F1 completes a hold circuit for the relays F and S, by virtue of voltage applied at terminal TP in the reader 16 as indicated when tape is in position therein. The reader 16 is of the type in which, except during the reading of a row of code elements, a voltage is applied to a "trip" terminal TR and this voltage is arranged to energise a relay A, connecting the H.T. line via the switch A2 to the interrupter contacts SWA*i* and SWB*i*. If the selectors of switches SWA and SWB are not already in position 1 they home to position 1, at which the interrupter contacts are short circuited through stud 1 of SWA*a*. Since the contacts at position 1 of the contact banks SWA*c*, *d* and *e*, and SWB*b*, *c* and *d* are open circuited, no sensitising signal is fed to the stores I and J at position 1. During this homing action, the clutch of the reader is disconnected from the H.T. line at the switch P3, C1 also being open, so that no reading occurs. The switch F3 removes a shunt from the armature of the interpolator motor M and the "parameter" shaft PS is rotated. At a predetermined position it causes energisation of relay D, by earthing one end of it. This occurs once while interpolation is occurring within any group of three I signals, and the corresponding three J signals.

When the relay D is energised, the clutch is connected to the H.T. line via switch D1, position 1 of bank SWA*b*, and the switch Y1, the assumption being that relay Y is energised. This causes the tape to be fed forward and the voltage at terminal TR is interrupted and the relay A is temporarily de-energised. Since the relay S is energised the leads from SWC to the selectors of the banks SWA*c*, *d* and *e* are connected together by switches S1, S2 and S3. It is arranged that the decimal numbers encoded on the tape following the alignment code are the co-ordinates $i_0$ and $j_0$ of a datum point and these numbers are repeated twice, so that $i_0$, $j_0$, $i_0$ and $j_0$ is encoded on the tape comprising twenty decimal digits in all. As the first decimal digit of these numbers is read by the reader 16, the voltage at the trip terminal TR is interrupted, relay A releases and switch A2 consequently opens and de-energises the selector coils SWAL and SWBL. This causes the selectors to advance to position 2, and a sensing pulse is applied to the first decimal unit of the stores $I_4$ and $J_2$ since as aforesaid the selectors of SWA*c*, *d* and *e* are interconnected by the switches S1, S2 and S3. When position 2 is attained on SWA and SWB, the clutch is re-energised via switches A2, C1 now released and SWA*b*, causing the next decimal digit to be read. This cycle of operations continues until the selectors of stepping switches SWA and SWB reach position 21 by which time all 20 decimal digits have been read. Moreover all the I stores store the value $i_0$ and all the J stores store the value $j_0$. During this cycle of operation it will be assumed there is no energisation of a relay T. On this assumption, on reaching position 21 of the switches SWA and SWB an open circuit is provided across the interrupter contacts SWA*i* and SWB*i*. This causes the selectors to motor home in known manner to position 1, there to await energisation of relay D to initiate a new reading cycle. The interpolator continues to operate and applies the signals $i_0$ and $j_0$ to the amplifiers 4 and 5 thereby the cutter axis is aligned with the position $x_0$, $y_0$ corresponding to the values of $i_0$ and $j_0$. After a given time, the relay D is again energised by the parameter shaft PS, and another reading cycle is started but it is arranged that in the next row of the tape the signal 16 is encoded which means "stop." The relay G is energised, releasing the relays F and S by the action of the switch G1. The relay G is held via the switch RLG2. The interpolator motor is stopped, and the selectors of SWA*c*, *d* and *e* are disconnected from each other by opening of the switches S1, S2 and S3. The code 16 however initiates another reading cycle via contact 1 of the bank SWA*b*. The numbers read from the reader are now arranged to represent say $i_1$, $j_1$, $i_2$ and $j_2$ and these by the action of the selectors SWC, SWA and SWB are fed to the I and J stores which are connected to those parts of the interpolators from which the outputs are not at the time connected. Everything now remains stationary until the start button is pressed, which operates the relays H and J by applying voltage to the terminal ST. One of the switches J2 then removes the shunt from the armature of the motor M allowing the interpolators to operate. Relay H is held by switch H1 until relay G is re-energised.

So far, the operation for initiating the generation of control signals representing only two contoured dimensions have been described. If a control signal representing a third, and stepped dimension is required, then within the twenty decimal digits, representing values of I and J, preceding the occurrence of a value of K, the recognition signal 29 is arranged to occur. The decimal digits as they occur are fed in cyclic order to the stores, by the cycle of operations just described, but when 29 is encountered, coded as 16+8+4+1, the relay coils T and U are energised and are held so by switches U3 and D2. The coils of relays T and U are not shown in the drawing, but it will be understood that they are connected from the lead OT29 to earth. The switch U3 is of the make-before-break type. The tape is advanced when code 29 is encountered, but the selectors of SWA and SWB do not advance, otherwise one decimal digit would be omitted from the stores I and J. When relay T is energised, positions 21 to 25 of the selectors are rendered effective by the action of the switches T1 and T2. The reading cycle is thus extended to 25 decimal digits. The last five digits are however used to encode a K value, positions 22 to 25 and 1 of the contact banks SWB$e$ and $f$ being connected to the sensitising leads of the stores $K_1$ and $K_2$ respectively, the store which is selected for sensitisation being determined by the switch 25 which as aforesaid is constituted by the relays U, V and W. As shown in the drawing, the relays V and W are so connected that each energisation of relay U reverses the condition of the relays V and W. When V is energised, a sensitising signal is applied by the switches U4 and V2 to the store K1 by way of the bank of contacts SWB$e$. On the other hand when relay V is de-energised, a sensitising signal is applied to the store K2 by way of the switches U4 and V2 and the contact bank SWB$f$. It will be assumed that in the cycle being described the five decimal digits representing a value of K1 are applied to the store K1. At the end of the cycle involving 10 decimal digits representing two values of I, 10 decimal digits representing two values of J and five decimal digits representing one value of K, there is sufficient information in the stores for three dimensional operation of the machine to start and the axis of the cutter is caused to describe a locus at a particular Z station, the locus being defined as variations of X and Y as terms of the parameter represented by the shaft PS. Thereafter, until the locus at the Z station in question has been completed the programme unit carries out successive 20 decimal digit cycles, applying successive values of I and J to the I and J stores, without effecting the K stores. However, when the K value has to be changed to define another K station, the 20 digit cycle is again changed to a 25 digit cycle by introducing, as described above, the recognition code 29 in the first 20 digits of this cycle. When this recognition code is identified by the decoder 24, the relays T and U are again energised, and the switch 25 is changed to its alternate state with the relay V de-energised and the relay W energised. This causes the sensitising signal which is established when the relay U is energised to be applied to the contact bank SWB$f$ and thence to the store K2. Consequently the new value of K is stored by the store K2 and when the interpolator transfers to the appropriate values of I and J, the value of K which is stored in the store K2 is now used to position the cutter at a new K station.

The decoder 24, as described, is able to recognise 16 different recognition codes and those which have not been referred to may be used as desired to perform other control functions in the machine tool. The code 31 for example means "erase" and when read, the tape is fed on but selectors SWA and SWB are not advanced. However the use of the other codes forms no part of the present invention and are not to be further described. Furthermore some of the relay switches are omitted from the drawings and others which are illustrated are not referred to in the description, because their function is either obvious or not relevant to the invention.

Figure 3:
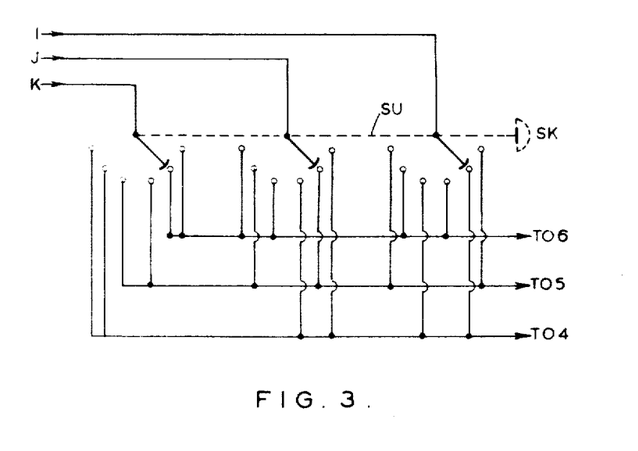
FIGURE 3 is a detailed view of the selector unit employed for the mechanism illustrated in FIGURE 1.

The form of the selector unit shown in FIGURE 3 comprises three rotary switches SWD, SWE and SWF each having six positions with self explanatory connections thereto. The selectors of the switches are ganged on a common shaft SU, which can be rotated manually by a knob SK.

Regarding the connections from the banks of contacts SWA$c$, $d$ and $e$ and SWB$b$, $c$, $d$, $e$ and $f$, it will be understood that each group of five connections denoted by the same reference say $I_1$, are connected in the corresponding store to the terminals denoted by A6 to A10 in the drawing of the U.S. application Serial Number 620,145. Furthermore, the order of sensitising the stores indicated by the order of the connections to $I_1$ to $I_5$ and $J1$ to $J8$ is arranged for the case in which the stores $I_2$ and $I_4$ are connected permanently to the mid-points of the two parabolic bridges which form interpolator 21, whilst the stores $J2$ and $J4$ are similarly connected permanently to the mid points of the bridges which form the interpolator 22. For example, taking FIGURE 2 of the specification of co-pending United States application Serial Number 581,038 as representing the interpolator 21, then the stores $I_2$ and $I_4$ respectively are connected permanently to the leads 68 and 71 of the prior specification. Corresponding re-arrangement of the connections of the stepping switches 60 and 61 of the prior specification are required. Alternatively the connections from the stepping switches SWA and SWB of the present specification can be re-arranged to suit FIGURE 2 of the prior specification, the re-arrangement required in either case being obvious.

Although the invention has been described as applied to a hydraulically controlled machine, it is applicable to machines controlled in other ways.

What we claim is:

1. Automatic control mechanism capable of controlling relative displacement between two relatively movable members, comprising reading means for deriving discrete signals from a record of such signals, a first group of stores, a second group of stores, further storage means, programme means for applying signals derived by said reading means in a predetermined order to said first and second group of stores to store said signals, and including means responsive to a predetermined recognition signal derived by said reading means for interrupting said order and applying selected ones of said discrete signals derived from the record to said further storage means, first interpolating means for interpolating within signals stored in said first group of stores to derive one control signal which varies to represent a first contoured dimension, second interpolating means for interpolating within signals stored in said second group of stores to derive a second control signal which varies to represent a second contoured dimension, an output circuit for said further storage means producing a third control signal which equals a stored discrete signal derived from said record for the duration of intervals of variation of said first and second control signals, means for changing said third control signal from one stored discrete signal to another derived from said record between such intervals, and means responsive to said control signals for relatively displacing said members in three co-ordinate directions.

2. Automatic control mechanism according to claim 1, said further storage means comprising a two further stores, said programme means including means for applying selected signals alternately in one order to said further stores in response to successive occurrences of said predetermined recognition signal, whereas said means for deriving said third control signal includes means for deriving said third control signal alternately but in the reverse order from said further stores, whereby the signal in one of said further stores can be changed whilst that in the other further store is employed in the derivation of said third control signal.

3. Automatic control mechanism according to claim 1, said means for producing relative displacement comprising three servo means for producing displacement in said three co-ordinate directions and means for applying said three control signals individually to said servo means.

4. Automatic control mechanism according to claim 3 comprising selector means for applying said three control signals in a selected one of different combinations to said servo means.

5. Automatic control mechanism capable of controlling relative displacement between two relatively movable members, comprising first, second and third means for producing relative displacements between said members in each of three co-ordinate directions, means for reading a record, which record includes representations of discrete values of one of said co-ordinates, storage means responsive to said reading means for storing said discrete values in succession, an output circuit for said storage means producing a first control signal representing said discrete values only, means responsive to said record for deriving two further control signals variable in substantially continuous manner, means for maintaining said first control signal unchanged during intervals of variation of said further control signals and for changing said first control signal to a different value between such intervals, said first, second and third means for producing relative displacements being responsive respectively to said control signals.

References Cited in the file of this patent
UNITED STATES PATENTS

| | | |
|---|---|---|
| 2,755,422 | Livingston | July 17, 1956 |
| 2,820,187 | Parsons et al. | Jan. 14, 1958 |
| 2,833,941 | Rosenberg et al. | May 6, 1958 |
| 2,929,555 | Spencer et al. | Mar. 22, 1960 |

FOREIGN PATENTS

| | | |
|---|---|---|
| 764,588 | Great Britain | Dec. 28, 1956 |
| 1,114,501 | Great Britain | Apr. 13, 1956 |

Disclaimer 3,086,154.—*Robert Ramsey Lowther*, Hayes, and *Peter Laurence Sell*, West Drayton, England. AUTOMATIC CONTROL OF MACHINE TOOLS. Patent dated Apr. 16, 1963. Disclaimer filed Feb. 24, 1966, by the assignee, *Electric & Musical Industries Limited*.
Hereby enters this disclaimer to claim 5 of said patent.

[*Official Gazette June 21, 1966.*]

order from said further stores, whereby the signal in one of said further stores can be changed whilst that in the other further store is employed in the derivation of said third control signal.

3. Automatic control mechanism according to claim 1, said means for producing relative displacement comprising three servo means for producing displacement in said three co-ordinate directions and means for applying said three control signals individually to said servo means.

4. Automatic control mechanism according to claim 3 comprising selector means for applying said three control signals in a selected one of different combinations to said servo means.

5. Automatic control mechanism capable of controlling relative displacement between two relatively movable members, comprising first, second and third means for producing relative displacements between said members in each of three co-ordinate directions, means for reading a record, which record includes representations of discrete values of one of said co-ordinates, storage means responsive to said reading means for storing said discrete values in succession, an output circuit for said storage means producing a first control signal representing said discrete values only, means responsive to said record for deriving two further control signals variable in substantially continuous manner, means for maintaining said first control signal unchanged during intervals of variation of said further control signals and for changing said first control signal to a different value between such intervals, said first, second and third means for producing relative displacements being responsive respectively to said control signals.

References Cited in the file of this patent

UNITED STATES PATENTS

| 2,755,422 | Livingston | July 17, 1956 |
| 2,820,187 | Parsons et al. | Jan. 14, 1958 |
| 2,833,941 | Rosenberg et al. | May 6, 1958 |
| 2,929,555 | Spencer et al. | Mar. 22, 1960 |

FOREIGN PATENTS

| 764,588 | Great Britain | Dec. 28, 1956 |
| 1,114,501 | Great Britain | Apr. 13, 1956 |

Disclaimer 3,086,154.—*Robert Ramsey Lowther*, Hayes, and *Peter Laurence Sell*, West Drayton, England. AUTOMATIC CONTROL OF MACHINE TOOLS. Patent dated Apr. 16, 1963. Disclaimer filed Feb. 24, 1966, by the assignee, *Electric & Musical Industries Limited*.
Hereby enters this disclaimer to claim 5 of said patent.

[*Official Gazette June 21, 1966.*]

Disclaimer 3,086,154.—*Robert Ramsey Lowther*, Hayes, and *Peter Laurence Sell*, West Drayton, England. AUTOMATIC CONTROL OF MACHINE TOOLS. Patent dated Apr. 16, 1963. Disclaimer filed Feb. 24, 1966, by the assignee, *Electric & Musical Industries Limited*.
Hereby enters this disclaimer to claim 5 of said patent.

[*Official Gazette June 21, 1966.*]